United States Patent [19]

Johnson et al.

[11] Patent Number: 5,691,499
[45] Date of Patent: Nov. 25, 1997

[54] BRIDGEWIRE LADDER INITIATOR

[75] Inventors: Darrin L. Johnson, Fountain Hills, Ariz.; David W. Lindsey; Virginia E. Chandler, both of Ogden, Utah; Robert D. Taylor, Hyrum, Utah

[73] Assignee: Morton International, Inc., Chicago, Ill.

[21] Appl. No.: 689,315

[22] Filed: Aug. 7, 1996

[51] Int. Cl.⁶ ............................. F42B 3/04; B60R 21/26
[52] U.S. Cl. ..................... 102/202.5; 280/741; 102/202.9
[58] Field of Search ..................... 102/202.7, 202.8, 102/202.5, 202, 200, 217, 202.9, 202.11; 89/8; 280/737, 741

[56] References Cited

U.S. PATENT DOCUMENTS

| | | | |
|---|---|---|---|
| 3,134,329 | 5/1964 | Zeman | 102/202.7 |
| 3,320,889 | 5/1967 | Holtz | 102/202.7 |
| 3,362,158 | 1/1968 | Thurston et al. | 102/202.5 |
| 4,033,610 | 7/1977 | Shingu et al. | 280/737 |
| 4,296,084 | 10/1981 | Adams et al. | 423/351 |
| 4,358,998 | 11/1982 | Schneiter et al. | 102/530 |
| 5,005,486 | 4/1991 | Lenzen | 102/531 |
| 5,109,772 | 5/1992 | Cunningham et al. | 102/275 |
| 5,368,329 | 11/1994 | Hock | 280/741 |
| 5,407,120 | 4/1995 | Philpot | 228/155 |
| 5,427,030 | 6/1995 | Kidd et al. | 102/202 |

*Primary Examiner*—Michael J. Carone
*Assistant Examiner*—Christopher K. Montgomery
*Attorney, Agent, or Firm*—Gerald K. White

[57] ABSTRACT

Multiple bridgewires are distributed through the length of the elongated tubular igniter of an automotive vehicle passenger side inflator. Upon receipt of an electrical stimulus the bridgewires ignite sensitive booster charges which ignite ignition powder within the igniter tube at the multiple distributed bridgewire locations. The use of this system eliminates the need for high velocity pyrotechnics in the ignition system to ignite the inflator gas generant within acceptable time constraints when the tubular igniter is ignited from one end by an initiator, and replaces the squib initiator.

8 Claims, 1 Drawing Sheet

BRIDGEWIRE LADDER INITIATOR

BACKGROUND OF THE INVENTION

1. Field of the Invention

The present invention relates to initiators for pyrotechnic devices. More specifically, the invention relates to an improvement in the mechamism for igniting a gas generator or inflator of the type that utilizes the combustion of a solid fuel gas generant composition for the generation of gas to inflate an automotive passive restraint inflatable crash protective air bag or cushion. The invention is particularly advantageous for use in cylindrical inflators of the type provided on the passenger side of an automotive vehicle and which, typically, include a linear igniter comprising an ignition powder contained within an elongated perforated igniter tube.

2. Description of the Related Art

In cylindrical passenger side inflators there has existed in the prior art an ignition distribution problem. This is because the burn rate of the ignition powder by itself is not adequate to ignite the inflator gas generant within acceptable time constraints when the inflator igniter tube is ignited from one end by an initiator. A solution proposed in the prior art to solve this problem is the use of a high velocity pyrotechnic to effect quick ignition also of the igniter powder at the opposite end of the inflator igniter tube from the initiator. The high velocity pyrotechnic device adds cost and complexity to the ignition system of the inflator.

Thus, there is a need and a demand for an improved ignition system that ignites the ignition powder over the entire length of the igniter tube within a relatively short period of time and eliminates the need for high velocity pyrotechnics in the ignition system.

SUMMARY OF THE INVENTION

An object of the invention is to provide an improved ignition system having particular utility for igniting within a relatively short period of time the ignition powder over the entire length of the elongated igniter tube of passenger side inflators for automotive air bags.

Another object of the invention is to provide for a passenger side inflator for automotive air bags a bridgewire initiator that replaces the conventional squib initiator and effects an enhancement in the ignition distribution and therefore gas generation propagation within desirably short and acceptable time constraints.

In accomplishing these and other objectives of the invention, multiple bridgewires are arranged into a ladder configuration with bridgewires crossing between two electrodes at spaced intervals, forming a parallel electrical circuit. Each bridgewire is surrounded by a small sensitive booster charge which transforms the bridgewire signal into a pyrotechnic output which is effective for the ignition of pyrotechnics that are used within the igniter system of the inflator.

The bridgewire ladder initiator is placed inside the elongated igniter tube which is used in passenger side pyrotechnic inflators. The igniter tube with the bridgewire ladder initiator inside is filled with pyrotechnic ignition powder which surrounds the initiator.

Upon receipt of an electrical stimulus between the two electrodes, current passes through the network of bridgewires distributed at intervals through the length of the igniter tube. The electrical current causes the temperature of each bridgewire to increase above the ignition temperature threshold of the booster charge, causing burning thereof. The booster charge surrounding each bridgewire in turn ignites the ignition powder within the igniter tube at the multiple intervals of each bridgewire location which results in rapid and evenly distributed ignition of the powder over the entire igniter tube length.

The device may be manufactured using vapor deposition on substrates or using traditional metal wire techniques.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification and in which like parts are designated by the same reference numerals, of which drawings.

DESCRIPTION OF THE PREFERRED EMBODIMENT

Figure 1:
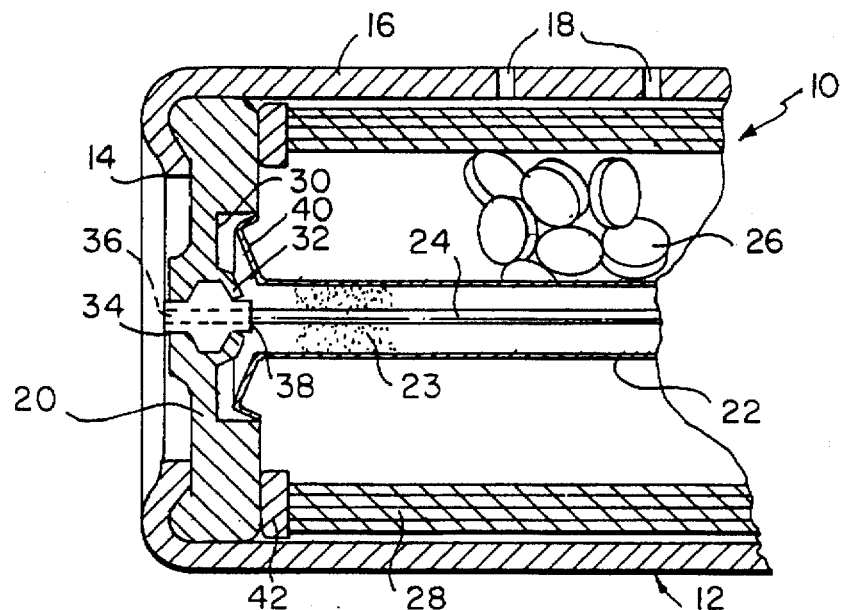
FIG. 1 is a fragmented longitudinal cross sectional view of a cylindrical passenger side inflator in which the bridgewire initiator according to the invention is embodied.

A fragmented illustration of a gas generator or inflator 10 is shown in FIG. 1 of the drawings. The inflator 10 is applicable for use in an automotive vehicle cushion restraint system that includes an air bag (not shown). The inflator 10 is particularly adapted for use on the passenger side of a vehicle, being mounted in a conventional manner known to those in the art in or on the dashboard of the vehicle.

The inflator 10 includes a generally cylindrical housing 12 having a closed end (not shown) and an open end 14 with a tubular side wall portion 16 therebetween. The housing 12 preferably is fabricated of aluminum, with the closed end (not shown) integral with the elongated tubular side wall portion 16. The tubular side wall portion 16 defines a plurality of openings or apertures, generally indicated at 18, to permit the outflow of generated gas. The apertures 18 are provided in a repetitious pattern along the side wall portion 16 in diametrically opposed groups. With this positioning of the apertures 18, an outflow of gas does not produce uneven thrust which could cause the inflator to become a projectile. Such "thrust neutral" deployment of the apertures 18 is known in the art. A generally circular igniter base member and initiator holder 20 is mounted in a sealed manner in the open end 14 of the housing 12.

For convenience, the igniter base member and initiator holder 20 is referred to hereinafter as "member 20." The housing 12 contains an igniter tube 22 containing pyrotechnic ignition powder 23 and a bridgewire initiator strip 24, a combustible gas generant material 26, and a filter assembly 28.

The member 20 functions to provide closure for the housing 12 and also to enable ignition of the combustible gas generant material 24 that is contained therein. The open end 14 of the wall of housing 12 is roller crimped over the peripheral portion of the member 20, as described in more detail hereinafter.

On the inner side of the member 20 is a centrally located circular recess 30 having an inner integral circular skirt 32. Prior to assembling the igniter tube 22 in the inflator 10 the skirt 32 is tubular. Centrally located with respect to the skirt 32 is a circular opening or aperture 34 that extends in reduced dimension to the outer side of the member 20, with an inner portion of the aperture 34 having a diameter that is the same as that of the skirt 32.

An initiator molded adapter 36 of generally hemispherical configuration and appropriate dimensions is received from the inner side of the member 20, inside the skirt 32. A major portion of the adapter 36 extends through the aperture 34 to the outer side of the member 20. With the molded adapter 36 so positioned within the skirt 32 and the aperture 34, the skirt 32 is roll crimped onto the molded adapter 36. As roll crimped in attached relation to the member 20, a portion 38 of the molded adapter 36 extends inwardly of the housing 12.

The end of the igniter tube 22 adjacent the inner side of the member 20 has an outwardly flared skirt 40 that is appropriately shaped to be received within the recess 30 in the inner wall of the member 20. With the igniter tube 22 positioned in the recess 30, the skirt 40 thereof engages the roll crimped portion of the skirt 32 with the portion 38 of the molded adapter 36 positioned snugly within an inner central region of the igniter tube 22.

With the member 20 so assembled to the igniter tube 22 and the initiator molded adapter 36, and with suitable conventional attachment means for the other end of igniter tube 22 provided on the inner side of the closed end of the inflator 10, as known to those in the art, and with gas generant material 24 and a filter 26 provided within the housing 12, including the provision of a suitable seal 42 between the filter 26 and the periphery of the member 20, the open end 14 of the wall of housing 12 is roll crimped over the peripheral edge of the member 20.

Figure 2:
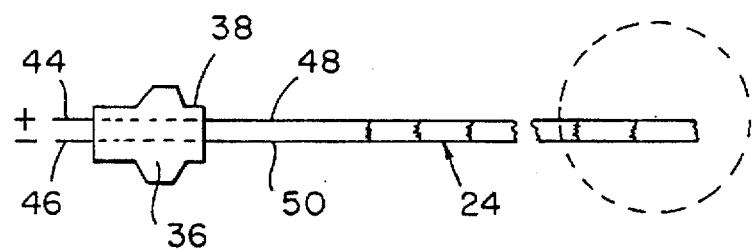
FIG. 2 is a front view of a physical embodiment of the bridgewire initiator according to the invention.
Figure 3:
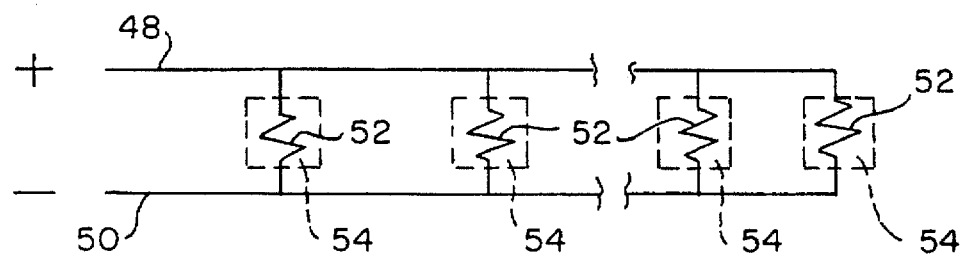
FIG. 3 is a schematic electrical circuit diagram of the bridgewire initiator shown in FIG. 2.

The initiator molded adapter 36 includes a pair of pin type terminals 44 and 46 to one of which a positive charge is applied and to the other of which a negative charge is applied. The pin type terminals 44 and 46 are suitably adapted in known manner for connection to a source of direct electrical current (not shown). From the pin type terminals 44 and 46 respectively associated leads or electrodes 48 and 50 extend to the bridgewire initiator strip 24, as shown in FIG. 2. Multiple bridgewires 52 are arranged in the strip 24 in a ladder configuration with bridgewires 52 crossing between the electrodes 48 and 50 at spaced intervals, forming a parallel circuit, as shown in FIG. 3. Each bridgewire 52 is surrounded by a small sensitive booster charge as indicated in FIG. 3 comprising a pyrotechnic coating 54. The pyrotechnic coating 54 transforms the bridgewire signal into a pyrotechnic output which is effective for ignition of pyrotechnics used within the ignition system of the inflator 10. As illustrated by the drawings, the bridgewire ladder is placed inside the long igniter tube 22. The igniter tube with the multiple bridgewire initiator strip 24 inside is filled with pyrotechnic ignition powder 23 which surrounds the bridgewire strip initiator 24, as shown in FIG. 1.

Upon receipt of an electrical stimulus between the pin type terminals 44 and 46 and the electrodes 48 and 50, electrical current passes between the network of bridgewires 52 that are distributed at spaced intervals within the length of the igniter tube 22. The current causes the temperature of each bridgewire 52 to increase above the ignition temperature threshold of the booster charge 54 causing the latter to burn. The booster charges 54 surrounding each bridgewire 52 in turn ignite the pyrotechnic ignition powder 23 within the igniter tube 22 at the multiple intervals of each bridgewire 52 location. This results in rapid and evenly distributed ignition of the powder over the entire length of the igniter tube 22.

This invention solves the ignition problem to which reference is made hereinbefore by simultaneously igniting multiple distributed areas of the igniter directly with the initiator and therefore eliminating the high velocity pyrotechnic device. The bridgewires within the described embodiment of this invention may be designed with specific sensitivities to control the timing and distribution of the ignition. This invention also replaces the traditional squib type initiator.

In accordance with the invention the bridgewire initiator strip 24 may be manufactured using vapor deposition or substrates or using traditional metal wire techniques. By way of example and not limitation, the bridgewire initiator strip 24 may be fabricated by depositing the electrodes 48 and 50 and electrically conductive bridgewires forming the ladder bridge on an elongated non-conductive thin film plastic plate or substrate such as a polyamide, wherein the electrodes and the electrically conductive ladder bridge are deposited in intimate contact with the film.

Thus, in accordance with the invention, there has been provided a passenger side inflator for automotive air bags comprising a bridgewire initiator that replaces the conventional squib initiator and effects an enhancement in the ignition distribution, and as a result, gas generation propagation within desirably short and acceptable time constraints.

Stated differently, there has been provided, according to the invention, an improved ignition system for passenger side inflators of automotive air bags which eliminates the conventional squib initiator and which has particular utility for igniting within an acceptably short period of time the ignition powder of the inflator over the entire length of the elongated igniter tube thereof.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather, it is intended that the scope of the invention be determined by the scope of the appended claims.

What is claimed is:

1. A flash ignition system for use in an inflator that employs solid fuel gas generant material to effect the inflation of a protective bag to cushion a passenger from impact with the structure of a vehicle in the event of a crash, which inflator includes a tubular housing having an elongated chamber therein containing the solid fuel gas generant material with the tubular portion of the housing having aperture means therein for directing generated gases to the protective bag comprising, an elongated perforated igniter tube positioned in the elongated chamber in the tubular housing with the solid fuel gas generant material therein distributed throughout the length of the chamber in surrounding relation to said igniter tube, pyrotechnic ignition powder, said igniter tube having an elongated chamber therein containing said pyrotechnic ignition powder, an elongated initiator positioned in said igniter tube with said pyrotechnic ignition powder distributed throughout the length of said igniter tube in surrounding relation to said elongated initiator, said elongated initiator comprising a network of multiple bridgewires, and means to apply an electrical stimulus to said network of multiple bridgewires.

2. A flash ignition system as defined in claim 1, wherein said means to apply an electrical stimulus to said network of multiple bridgewires comprises two electrodes, and an adapter having pin type terminals for connection to a source of direct electrical current.

3. A flash ignition system as defined in claim 1 wherein said multiple bridgewires are arranged in a ladder configuration with bridgewires crossing between two electrodes at spaced intervals forming a parallel circuit between the electrodes.

4. A flash ignition system as defined by claim 3 wherein each bridgewire is surrounded by a sensitive booster charge which transforms the bridgewire electrical stimulus into a pyrotechnic output which is effective for ignition of said pyrotechnic ignition powder and thereby the solid fuel gas generant material contained within the tubular housing of said inflator.

5. A flash ignition system as defined in claim 3 wherein each of said booster charges comprises a pyrotechnic coating on each of said multiple bridgewires, and wherein said electrical stimulus of said network of multiple bridgewires causes the temperature of each of said pyrotechnic coatings on said bridgewires to increase above a threshold causing it to burn and to ignite said pyrotechnic ignition powder which results in rapid and evenly distributed ignition of said pyrotechnic ignition powder over the entire length of said ignition tube.

6. A flash ignition system for use in an inflator that employs solid fuel gas generant material to effect the inflation of a protective bag to cushion a passenger from impact with the structure of a vehicle in the event of a crash, which inflator includes a tubular housing having an elongated chamber therein containing the solid fuel gas generant material with the tubular portion of the housing having aperture means therein for directing generated gases to the protective bag comprising, an elongated perforated igniter tube positioned in the elongated chamber in the tubular housing with the solid fuel gas generant material therein distributed throughout the length of the chamber in surrounding relation to said igniter tube, pyrotechnic ignition powder, said igniter tube having an elongated chamber therein containing said pyrotechnic ignition powder, an elongated initiator positioned in said igniter tube with said pyrotechnic ignition powder distributed throughout the length of said igniter tube in surrounding relation to said elongated initiator, said elongated initiator comprising a network of multiple bridgewires arranged in a ladder configuration with bridgewires crossing between two electrodes at spaced intervals and with each bridgewire surrounded by a temperature sensitive booster charge, whereby upon receipt of an electrical stimulus between said electrodes electrical current passes through the network of bridgewires, which current causes each bridgewire temperature to increase above the ignition temperature threshold of the booster charge causing the booster charge to burn and to ignite said ignition powder within said igniter tube at the multiple intervals of each bridgewire location which results in rapid and evenly distributed ignition of said ignition powder over the entire length of said igniter tube.

7. A flash ignition system as defined in claim 6 wherein each of said booster charges comprises a pyrotechnic coating on each of said multiple bridgewires which transforms the bridgewire electrical stimulus into a pyrotechnic output which is effective for ignition of said pyrotechnic ignition powder and thereby the solid fuel gas generant material contained within the tubular housing of said inflator.

8. A flash ignition system as defined in claim 6, further including means to apply a direct electrical current to said network of multiple bridgewires comprising an adapter connected to said two electrodes, said adapter having pin type terminals adapted for connection to a source of direct electrical current.

* * * * *